US010026208B2

(12) United States Patent
Nigam et al.

(10) Patent No.: US 10,026,208 B2
(45) Date of Patent: Jul. 17, 2018

(54) SYSTEM AND METHOD FOR GENERATING PRODUCT VISUALIZATIONS

(71) Applicant: **Micro*D, Inc.**, Charlotte, NC (US)

(72) Inventors: Manoj Nigam, Waxhaw, NC (US);
Mark McCuistion, Charlotte, NC (US);
Ron Gordon, Charlotte, NC (US);
Marek Scholaster, Podbelova (CZ)

(73) Assignee: **Micro*D, Inc.**, Charlotte, NC (US)

( * ) Notice: Subject to any disclaimer, the term of this patent is extended or adjusted under 35 U.S.C. 154(b) by 0 days.

(21) Appl. No.: 15/296,771

(22) Filed: Oct. 18, 2016

(65) Prior Publication Data

US 2017/0039749 A1 Feb. 9, 2017

Related U.S. Application Data

(63) Continuation of application No. 14/945,182, filed on Nov. 18, 2015, now Pat. No. 9,501,861, which is a continuation of application No. 13/768,363, filed on Feb. 15, 2013, now Pat. No. 9,224,234.

(51) Int. Cl.

| | |
|---|---|
| *G06T 11/60* | (2006.01) |
| *G06T 15/04* | (2011.01) |
| *G06T 15/50* | (2011.01) |
| *G06T 19/00* | (2011.01) |
| *G06Q 30/06* | (2012.01) |
| *G06T 5/00* | (2006.01) |
| *G06T 11/00* | (2006.01) |

(52) U.S. Cl.
CPC .......... *G06T 11/60* (2013.01); *G06Q 30/0621* (2013.01); *G06Q 30/0643* (2013.01); *G06T 5/002* (2013.01); *G06T 11/001* (2013.01); *G06T 15/04* (2013.01); *G06T 15/503* (2013.01); *G06T 19/00* (2013.01); *G06T 2207/20182* (2013.01); *G06T 2207/20221* (2013.01); *G06T 2210/04* (2013.01)

(58) Field of Classification Search
None
See application file for complete search history.

(56) References Cited

U.S. PATENT DOCUMENTS

| | | |
|---|---|---|
| 5,111,392 A | 5/1992 | Malin |
| 6,002,855 A | 12/1999 | Ladner et al. |
| 6,052,669 A | 4/2000 | Smith et al. |

(Continued)

*Primary Examiner* — Vu Nguyen
(74) *Attorney, Agent, or Firm* — Maschoff Brennan

(57) ABSTRACT

This disclosure includes a method for electronically generating a single image for product visualization. The method comprises receiving a selection of a first variation of a first consumer product layer with a first depth attribute from a plurality of variations of the first consumer product layer, each variation comprising at least one surface. The method further includes receiving a selection of a second variation of a second consumer product layer with a second depth attribute from a plurality of variations of the second consumer product layer, each variation comprising at least one surface. The method also includes layering the first variation of the first consumer product layer in the single image based at least on the first depth attribute; and layering the second variation of the second consumer product layer in the single image based at least on the second depth attribute. Related systems and apparatuses are also disclosed.

17 Claims, 14 Drawing Sheets

(56) References Cited

U.S. PATENT DOCUMENTS

| | | |
|---|---|---|
| 6,256,038 B1 | 7/2001 | Krishnamurthy |
| 6,727,925 B1 | 4/2004 | Bourdelais |
| 7,016,747 B1 | 3/2006 | Ninomiya |
| 7,149,665 B2 | 12/2006 | Feld et al. |
| 7,542,925 B2 | 6/2009 | Tung |
| 7,734,512 B2 | 6/2010 | Tuttle et al. |
| 8,194,069 B2 | 6/2012 | Thomas-Lepore et al. |
| 8,295,962 B2 | 10/2012 | Jones et al. |
| 2005/0081161 A1* | 4/2005 | MacInnes ........... G06F 17/5004 715/765 |
| 2006/0119600 A1 | 6/2006 | Lokovic et al. |
| 2006/0277119 A1 | 12/2006 | Tung |
| 2010/0245352 A1 | 9/2010 | Chakraborty |
| 2010/0284607 A1* | 11/2010 | Van Den Hengel .... G06T 7/564 382/154 |
| 2011/0172797 A1 | 7/2011 | Jones et al. |
| 2012/0109350 A1* | 5/2012 | Buchowski ............. G06F 17/50 700/98 |
| 2013/0328870 A1* | 12/2013 | Grenfell .................. G06T 15/04 345/420 |

\* cited by examiner

SYSTEM AND METHOD FOR GENERATING PRODUCT VISUALIZATIONS

CROSS-REFERENCE TO RELATED APPLICATIONS

This application is a continuation of and claims the benefit of U.S. patent application Ser. No. 14/945,182, filed on Nov. 18, 2015, which is a continuation of and claims the benefit of U.S. Pat. No. 9,244,234, filed on Feb. 15, 2013, the contents of which are incorporated herein by reference in their entirety.

TECHNICAL FIELD

The present disclosure relates generally to product display, and more particularly to a system and method for generating product visualizations.

BACKGROUND

With the advent of e-commerce, businesses have frequently sought opportunities to sell and advertise products and services over the internet, by email, or by other electronic means. However, in such e-commerce situations, the consumer is not able to observe a desired physical consumer product. A consumer could go to a physical location to observe the consumer product, but that involves additional effort which may discourage the consumer from purchasing the consumer product. When customized products are involved, because of the many possibilities available for a customized product, even if a consumer were willing to go to a physical location, a consumer may still not be able to see the desired customized product because the customized product in desired variation has not been manufactured or is not present at the physical location. A business may desire to provide a representation of the consumer product such that a consumer may visually observe what the desired consumer product may look like electronically with sufficient detail to provide the consumer with confidence when making a purchase.

SUMMARY

In one embodiment, a method for electronically generating a single image is disclosed. The method comprises receiving a selection of a first variation of a first consumer product layer with a first depth attribute from a plurality of variations of the first consumer product layer, each variation comprising at least one surface. The method further includes receiving a selection of a second variation of a second consumer product layer with a second depth attribute from a plurality of variations of the second consumer product layer, each variation comprising at least one surface. The method also includes layering the first variation of the first consumer product layer in the single image based at least on the first depth attribute; and layering the second variation of the second consumer product layer in the single image based at least on the second depth attribute.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

Figure 1:
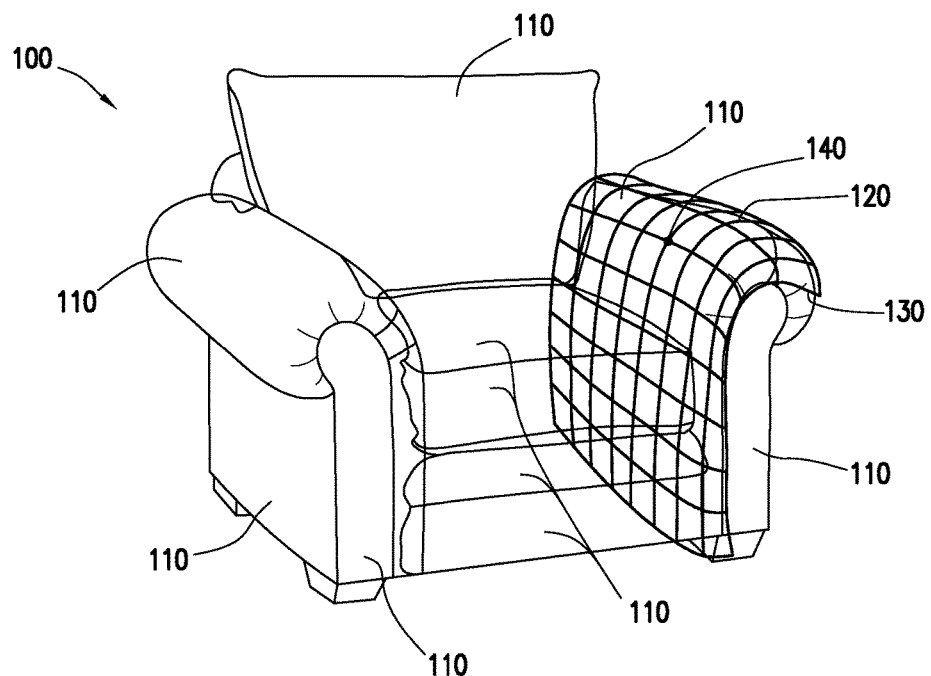
FIG. 1 illustrates an example of a customizable consumer product, in accordance with the present disclosure.

The present disclosure may be related to a database for dynamically generating a photorealistic image of a consumer product. The photorealistic image may be made up of distinct layers, each corresponding to a particular region or feature of the consumer product that may be variable. The different layers are compiled to create a single, unitary composite image. In some embodiments, each layer may include one or more surfaces to have a texture mapped thereon. The textures among the different surfaces and layers may be specifically aligned and mapped so that the image appears as it would in real life, despite being a combination of distinctly textured images compiled in a single image. The textures, layers, and variations may be stored in the database to be called out to dynamically compile an image of a customized consumer product.

As used herein, a photorealistic image may include a photograph, an image derived from or incorporating one or more photographs, or a digital image that accurately depicts something as it would appear in real-life.

For customized consumer products, it may be difficult or cost-prohibitive to create visualizations of what a customer's desired customized product may look like. One approach to address this may be to run a plug-in or other downloaded software in a consumer's web-browser for generating a three-dimensional representation of the customized product. However, such an approach poses a variety of problems. First, the software generating the visualization must be written for a variety of web browsers and a variety of operating systems. It also requires a consumer to be willing to download and utilize the software or plug-in on their computer. Such components have been notorious for their potential of risk to a user's computer. Second, such programs or plug-ins also impose additional resource utilization on the user's computer. Third, the visualization is still just a computer-generated representation of what the product may look like, and to generate a photorealistic three-dimensional model of each iteration is very expensive.

An alternative approach may be to take a digital photograph of each iteration of a customized consumer product based on the options offered by the manufacturer of a customized consumer product. However, as the number of options increases, the number of iterations increases dramatically, which may be cost-prohibitive in a variety of ways.

For example, if a consumer were to select features for a customized couch, the consumer might pick one of five arm styles, one of three back types, one of five feet types, and one of thirty materials. Such an arrangement would require:

5 arms×3 backs×5 feet×30 materials=2,250 iterations

It may be extremely costly for a manufacturer to create a physical copy of each of the thousands of iterations of the consumer product, just to be photographed. Such an approach may also be resource-costly to maintain and store that many digital pictures on a server. These costs may be amplified in markets in which a high rate of change is seen in consumer products. For example, in some furniture or clothing market segments, styles, materials, and products may change multiple times a year. Thus, the costs associated with generating these images may not be just a one or two time investment, but may be a frequently-repeated cost.

Some consumer products may include different surface textures or materials. For example, couches, cabinets, flooring, and clothing all may have a physical layout that may be separate and distinct from the surface texture or material of the consumer product. To maintain the integrity and visual appeal of digitized photographs in such consumer products, some approaches may take digital photographs of each iteration of the physical layout of the consumer product, and apply a texture to each physical configuration. For example, if a customized couch were being imaged, each possible iteration of the physical layout of the customized couch may be captured in a digitized photograph, and then the texture may be applied to the couch in the digital photograph. Using the example from above, such an approach might require:

5 arms×3 backs×5 feet=75 iterations

Using those seventy-five iterations as a base, the thirty materials may then be mapped to them based on a consumer's selection of a given iteration of the physical layout and a selected material or texture.

For the purposes of this disclosure, texture may mean the visual appearance of a consumer product with a variety of possible visual appearances, and may include both the material used and the appearance of the material. For example, this may include the style, material, pattern, image, repeat unit, or combinations thereof of a consumer product with upholstery, fabric, textile, or leather. As another example, it may include the material, finish, color, stain, or combinations thereof of a consumer product with wood. It may include the material, finish, color, plating, or combination thereof of a consumer product with metal or metal-appearing material. It may also include any combination of the above, for example, a consumer product with a combination of metal, wood, and fabric. These examples are non-limiting and merely serve to illustrate a few examples of the visual appearance of a consumer product with a variety of possible visual appearances. Additionally, a texture need not be applied to a consumer product, but may be applied to any component, feature, or material with a variety of possible visual appearances, for example, a wall or a floor.

A texture may be represented by a digital photograph of the texture, a computer-generated texture, or combinations thereof.

A manufacturer of a consumer product may designate a particular focal point or desired orientation of a given texture by selecting a point in the texture as a reference point. For example, for a particular floral pattern in furniture fabric, a manufacturer may designate the edge of a particular petal of a flower in the pattern as the reference point, or a manufacturer may designate a particular point in a stripe as the reference point. This may be a point that is desired to be accented, or may facilitate providing a distinctive look or feel to the consumer product based on the placement of the reference point. This may also be an arbitrary choice by the manufacturer. In some embodiments, a manufacturer might designate a particular orientation, or other factors to dictate how they will manufacture a given product. With reference to FIG. 1, to apply a texture to a surface 110 of a consumer product 100, a texture map 120 may be created for each surface 110. This may also be referred to as a surface map. Texture map 120 may be any set of guidelines, gridlines, parameters, restrictions, instructions, or combinations thereof indicating how a texture should be warped, modified, curved, or draped on surface 110. For example, a Coons surface corresponding to the surface of the consumer product may be created by defining a curve for each of the four edges of the surface, those four curves meeting at four corners. Linear interpolation may be used to interpolate between the two pairs of edges, producing a surface that may include a grid 130 of unit squares. An image of a texture may be mapped on to grid 130 corresponding to the Coons surface. Any other method may be used to create texture map 120 of surface 110 of consumer product 100. For example, bilinear interpolation may be used, or bicubically blended or partially bicubically blended Coons patches may be used, or a surface interpolated based on the corners rather than the edges may be used.

Texture map 120 may include a sync point 140. Sync point 140 may include a designation of a particular point on surface 110 to correspond to the manufacturer's indicated reference point when the texture is mapped onto surface 110 using texture map 120. This may ensure that a particular texture appears visually on a given surface according to a manufacturer's desired specifications. This may also allow two different manufacturers to produce a different looking design, despite using the very same texture.

Designating the sync point 140 may play a role in how a texture will visually transition from one surface to another. For example, the sync point 140 may play a role in how an upholstery pattern will transition from the seat of a sofa to the arms of the sofa. Some manufacturers may use a four-way match, meaning the texture matches to surfaces in four directions. In the example of a sofa, the upholstery pattern on the sofa seat may match in two directions (vertically) when transitioning to the sofa back and to the front of the sofa, and two directions (horizontally) for each arm. Some manufacturers may also use a two-way match, meaning the texture matches to surfaces in two directions. For example, the pattern may match in two directions (vertically) when transitioning to the sofa back and to the front of the sofa. Other matching schemes may be used. For example, point match, spot match, or flow match schemes. Whichever matching scheme may be used, the sync point 140 for each surface 110 may be selected such that when the reference point of a texture is aligned with the sync point 140 of texture map 120, a manufacturer's desired matching scheme is accurately depicted in the texture applied to the image as the texture transitions between surfaces 110. Similarly, a manufacturer designated orientation, or other characteristic may be utilized in mapping a texture to a surface.

In determining how to map a texture to a consumer product, other factors may be included. For example, scale, saturation, shading, or any other characteristic for a particular texture may be included. Scale may be based on the size of the furniture with respect to a repeat pattern of a texture. Saturation and shading may be based on a user choice implemented in software to facilitate a realistic texture and lighting model.

With reference to the example described above of a custom sofa with five arm, three back, and five feet possibilities, seventy-five digital pictures of the possible physical configurations of a couch may be captured or received. Each of those seventy-five physical configurations may have each of their surfaces individually texture mapped and given a sync point such that when a given texture is applied to one of the seventy-five iterations, a photorealistic image of the customized couch may be generated with the texture applied exactly how the manufacture would manufacture the customized couch. However, generating such a large number of digital pictures with corresponding texture maps may be costly for a manufacturer to implement. This may be amplified when the number of options and the number of variations of the options increases.

According to some embodiments of the present disclosure, the above-described process of texture mapping images of a consumer product may be modified. Each region of a consumer product that varies may be separated into a distinct image, and those images used to dynamically compile a single image rather than preparing a single image independently for each possible iteration. For example, each region that is variable may be a layer given a depth attribute such that a plurality of layers are placed on top of each other according to the depth attributes to produce a compiled, single image of the consumer product. The result may be a photorealistic image.

As used herein, the term layer may refer to a logical designation corresponding to a particular region or feature of a consumer product that may be variable and may occur at varying depths in a compiled image. For example, a layer may correspond to a variable couch back or variable arms of a couch. In other embodiments, a layer may correspond to a floor or a wall. In yet other embodiments, a layer may be empty. Layers or certain selections within a layer may be compiled on top of each other, beneath each other, or combinations thereof to form a compiled image.

FIGS. 2-6 illustrate an example embodiment of a customizable sofa with variable portions separated into distinct images.

Figure 2:
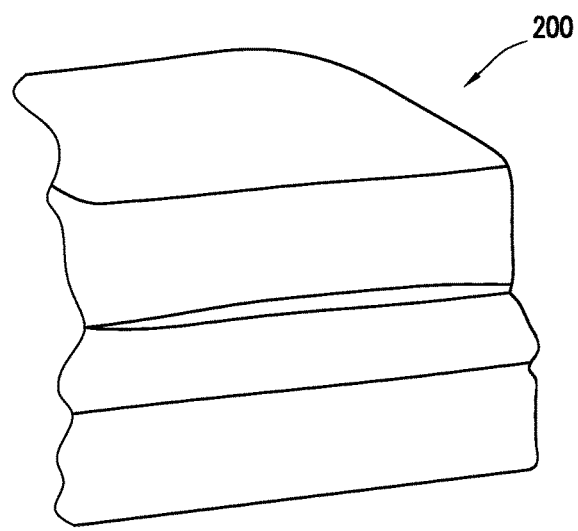
FIG. 2 illustrates an example of variations of a layer of an example customizable consumer product, in accordance with the present disclosure.

FIG. 2 depicts one digitized image of one portion of a customizable sofa. For example, FIG. 2 depicts a region 200 of a customizable sofa that may be common to all variations or iterations of the sofa. While only a single region 200 may be illustrated, it will be appreciated that any number of regions or portions, whether adjacent or not, may be included as being common to all variations of the sofa. Additionally, this may optionally include a shadow of the entire sofa or just the pictured region of the sofa. A first layer of the compiled image may comprise region 200. While a layer is described that is common to each variation, it will be appreciated that for some commercial products, there may not be a region that is common to all variations. In such embodiments, this layer may be completely omitted or may be a completely transparent layer. This layer may also be given a depth attribute corresponding to what depth the layer should occur in the compiled image.

The depth attribute may be any variable, numerical value, coordinate, language, instruction, or combination thereof indicating a position of depth in the compiled image relative to the other layers. For example, a depth attribute may have a value of zero at the bottom layer, and increase incrementally for each successive layer.

To generate the image shown in FIG. 2, a digitized photograph of an embodiment of the customizable consumer product containing region 200 may be received. Other visual elements besides region 200 may then be removed from the image, and the remainder of the image besides region 200 may be made transparent.

In some embodiments, the digitized picture of region 200 may be received with a texture already visible on it. The texture may be removed, leaving a plain image of region 200 without a texture applied to it. This may correspond to a white depiction of region 200, although any plain depiction may be used. In some embodiments, the shading or other interplay with light may be retained when the texture is removed.

Figure 3A:
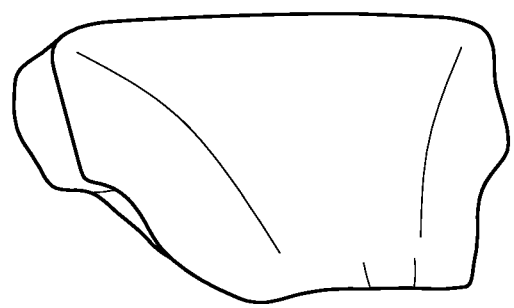
FIGS. 3A-3C illustrate examples of variations of an alternative layer of an example customizable consumer product, in accordance with the present disclosure.
Figure 3B:
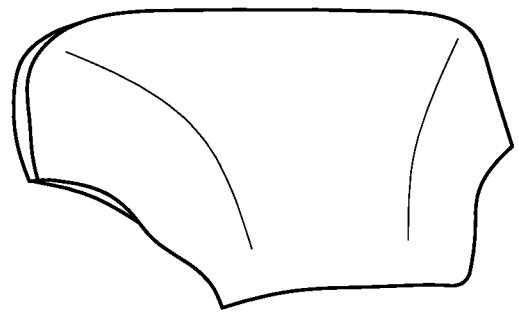
Figure 3C:
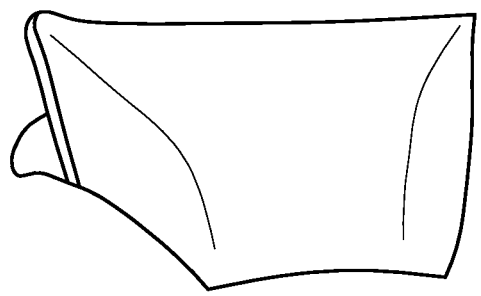
Figure 4A:
FIGS. 4A-4E illustrate examples of variations of an alternative layer of an example customizable consumer product, in accordance with the present disclosure.
Figure 4B:
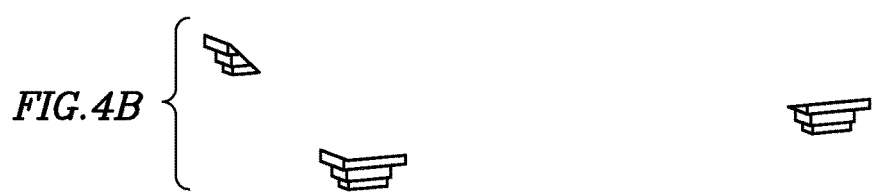
Figure 4C:
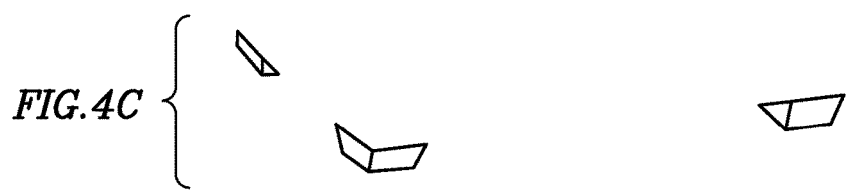
Figure 4D:
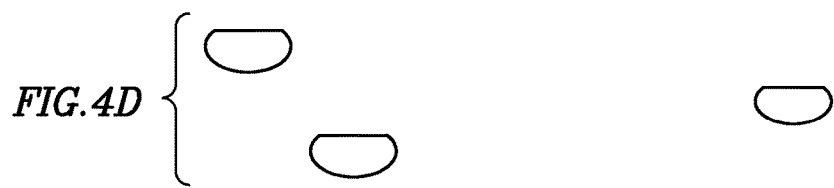
Figure 4E:
Figure 5A:
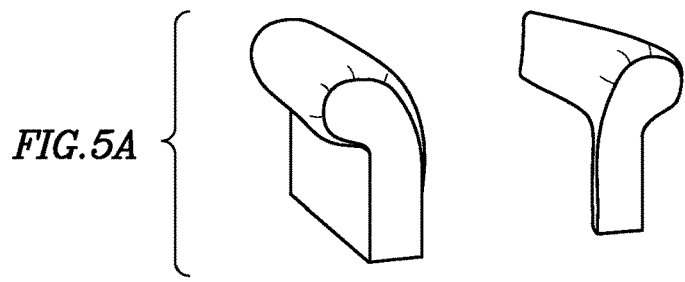
FIGS. 5A-5E illustrate examples of variations of an alternative layer of an example customizable consumer product, in accordance with the present disclosure.
Figure 5B:
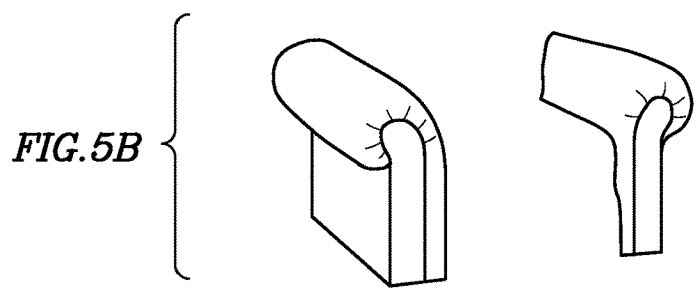
Figure 5C:
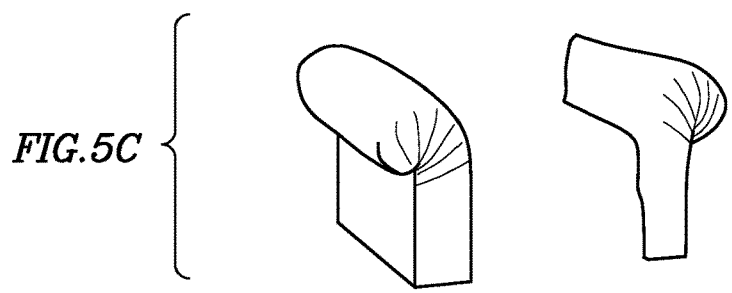
Figure 5D:
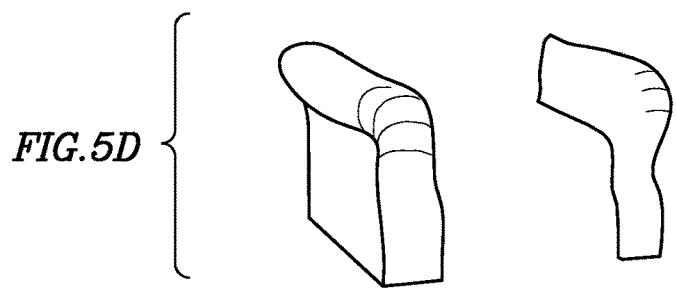
Figure 5E:
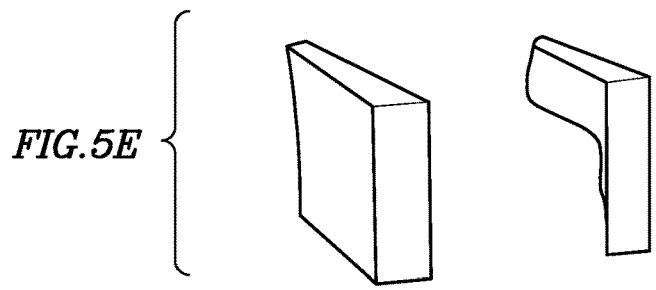

FIGS. 3A-3C illustrate example embodiments of a second layer of the compiled image. FIGS. 3A-3C illustrate examples of variations of a variable region of a customized sofa: the sofa back. This variable region may be separated into distinct images, as illustrated in FIGS. 3A-3C. Each of FIGS. 3A-3C may be variations of the same second layer. This second layer may include a depth attribute. In this way, regardless of which style or variation of back is selected in customizing the sofa, the layer corresponding to the sofa back may occur at the same depth in the compiled image. Alternatively, the depth attribute may be assigned to the particular variation rather than the layer generally. In such an embodiment, different variations of the sofa back could occur at different depths, depending on the variation. For example, if one particularly large variation overlapped other parts of the sofa, or were designed to sit in front of parts of the sofa, it may be desired to have different variations of the same region at different depths. As shown in FIGS. 3A-3C, the variable regions may be configured such that when placed in a compiled image, the back appears to be part of a sofa, rather than a distinct image. The images of these variations may be generated as described with reference to FIG. 2. For example, the images may begin as digital photographs of the variations to facilitate producing a photorealistic compiled image.

FIGS. 4A-4E illustrate example embodiments of a third layer of the compiled image. FIGS. 4A-4E illustrate examples of variations of another variable region of a customized sofa: the sofa feet. This variable region may be separated into distinct images, as illustrated in FIGS. 4A-4E.

Each of FIGS. 4A-4E may be iterations of the same, third layer. This third layer may include a depth attribute. In this way, regardless of which style or variation of feet are selected in customizing the sofa, the layer corresponding to the sofa feet may occur at the same depth in the compiled image. Alternatively, the depth attribute may be assigned to the particular variation rather than the layer generally. In such an embodiment, different variations of the same region of a commercial product could occur at different depths, depending on the variation. As shown in FIGS. 4A-4E, the variable regions may be configured such that when placed in a compiled image, the feet appear to be part of a sofa, rather than a distinct image. The images of these variations may be generated as described with reference to FIG. 2. For example, the images may begin as digital photographs of the variations to facilitate producing a photorealistic compiled image.

FIGS. 5A-5E illustrate example embodiments of a fourth layer of the compiled image. FIGS. 5A-5E illustrate examples of variations of a variable region of a customized sofa: the sofa arms. This variable region may be separated into distinct images, as illustrated in FIGS. 5A-5E. Each of FIGS. 5A-5E may be iterations of the same, fourth layer. This fourth layer may include a depth attribute. In this way, regardless of which style or variation of arm is selected in customizing the sofa, the layer corresponding to the sofa arms may occur at the same depth in the compiled image. Alternatively, the depth attribute may be assigned to the particular variation rather than the layer generally. In such an embodiment, different variations of sofa arms could occur at different depths, depending on the variation. As shown in FIGS. 5A-5E, the variable regions may be configured such that when placed in a compiled image, the arms appear to be part of a sofa, rather than a distinct image. The digitized images of these variations may be generated as described with reference to FIG. 2. For example, the images may begin as digital photographs of the variations to facilitate producing a photorealistic compiled image.

Figure 6:
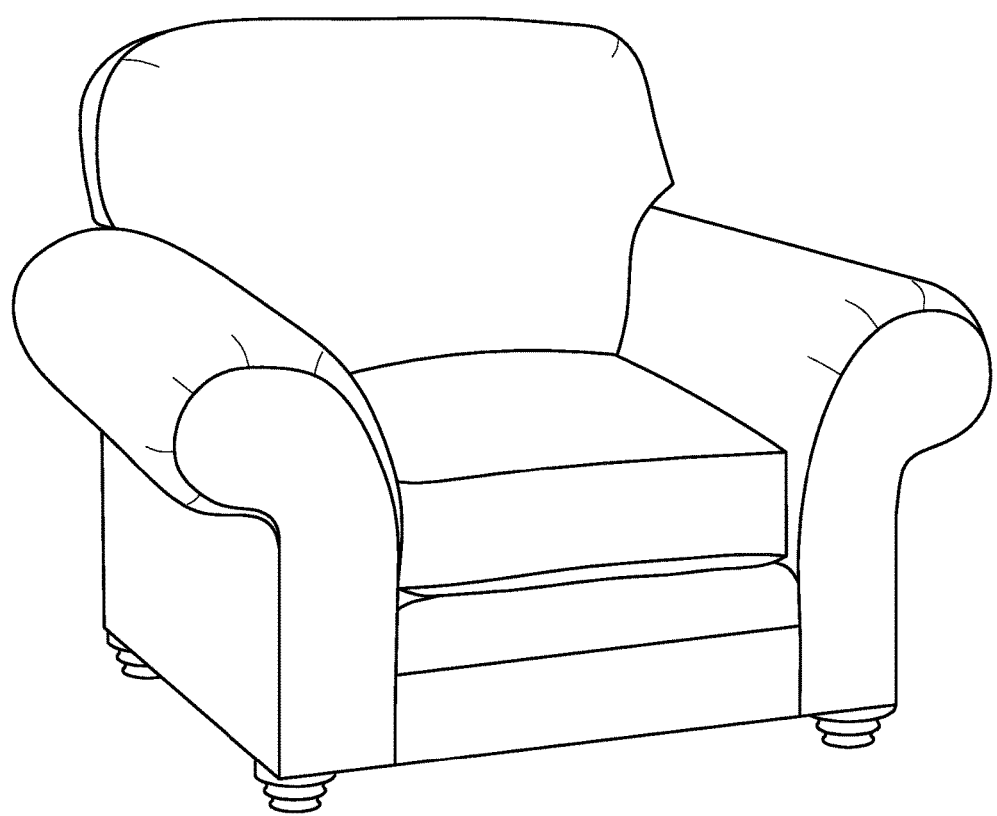
FIG. 6 illustrates an example of a compiled digitized image of an example customizable consumer product, in accordance with the present disclosure.

FIG. 6 depicts an example of a dynamically compiled image. As shown in FIG. 6, one variation for each of the layers may be selected to create a customized sofa. Each of those layers may be dynamically compiled into a single image of the desired combination. The first layer of FIG. 2 may have the lowest depth attribute and so be at the back of the compiled image. Next, the second layer corresponding to the sofa backs may have the next depth attribute, and so may be layered into the image next. For example, as shown in FIG. 6, the back shown in FIG. 3B may be selected and layered into the compiled image. Next, the third layer corresponding to the sofa feet may have the next depth attribute, and so may be layered into the image next. As shown in FIG. 6, the feet shown in FIG. 4A may be selected and layered into the compiled image. Lastly, the fourth layer corresponding to the sofa arms may have the last depth attribute, and so may be layered into the image last. As shown in FIG. 6, the arms shown in FIG. 5A may be selected and layered into the compiled image.

As shown in FIG. 6, by compiling each of the layers together, a completed image of the customized sofa may be dynamically created, without a previous image of the completed product stored. Additionally, the layers may be compiled in such a way that the layers appear to be a single photorealistic image rather than distinct separate images. In some embodiments, this may be the final image to be used, devoid of mapping a texture to the compiled image.

Figure 7A:
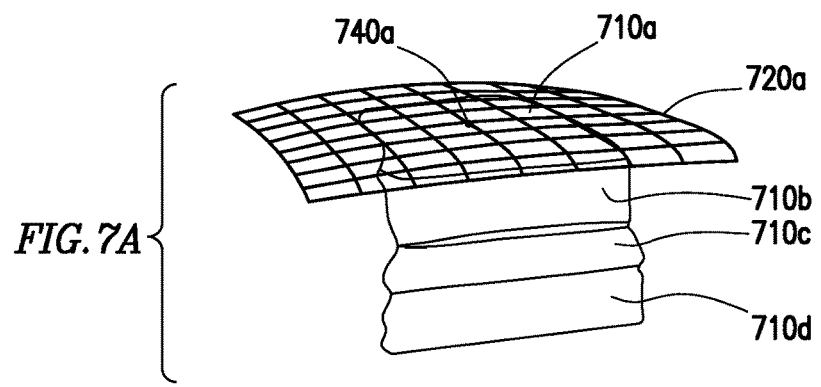
FIGS. 7A-7C illustrate examples of texture maps of an example customizable consumer product, in accordance with the present disclosure.
Figure 7B:
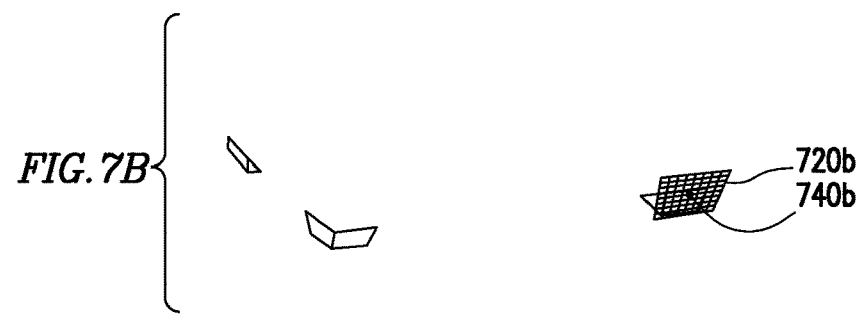
Figure 7C:
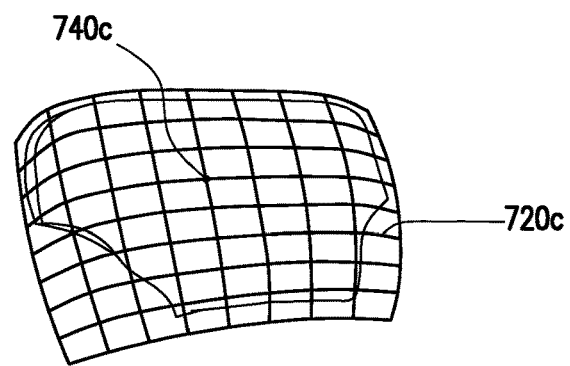

In creating the individual pictures of the variable regions of the consumer product, each of these individual variations may be given a texture map for each surface of that particular variation. FIGS. 7A-7C illustrate examples of generating texture maps for example variations of different layers of a customizable sofa. FIG. 7A illustrates a texture map 720*a* being generated for surface 710*a* of the customizable sofa including sync point 740*a*. In addition, it will be appreciated that surfaces 710*b*, 710*c*, and 710*d* may also have texture maps generated.

Similar operations are illustrated in FIGS. 7B and 7C. For example, FIG. 7B illustrates a texture map 720*b* with sync point 740*b* being generated for a particular variation of sofa feet. FIG. 7C illustrates a texture map 720*c* with sync point 740*c* being generated for a particular variation of sofa back. It will be appreciated that these are merely exemplary, and each surface of each variation may have a texture map generated.

In analyzing the number of texture maps to be created, and using the example above, rather than having to create digital photographs and corresponding texture maps for each complete iteration, i.e.

5 arms×3 backs×5 feet=75 iterations a much smaller number may be created, as they are merely layered into the overall picture:

5 arms+3 backs+5 feet+1 common layer=14 iterations

This allows for an additive cost rather than a multiplicative cost for adding variability. For example, if three different kinds of pillows were to be added to the example sofa, imaging and texture-mapping each iteration would require:

5 arms×3 backs×5 feet×3 pillows=225 iterations while in contrast, the layered approach may only require:

5 arms+3 backs+5 feet+3 pillows+1 common layer=17 iterations.

This may provide a substantial savings in the number of texture maps and physical embodiments of the customized sofa that must be created and imaged.

As will be appreciated, the number of layers and the number of variations may vary, while still remaining within the scope of the present disclosure. For example, pillows, decorative stitches, contrasting welt, or skirting may be added to the sofa shown in FIG. 6. As will also be appreciated, the same principles may be applied to any consumer product that may be customizable, where a "consumer" is any individual, business, or other entity requiring or desiring a customized product. For example, custom appliance design, custom automobile design, custom cabinetry design, custom airplane design, or any other consumer product may be used. This may also be particularly beneficial when a consumer product has a texture that must be mapped to a physical layout of the consumer product and a consumer desires to see a photorealistic image of what their customized consumer product will look like.

In some embodiments, additional layers beyond the customizable consumer product may be included in the compiled image. For example, a layer corresponding to a floor, one or more walls, trim, molding, wainscoting, rugs, accessories, or any combination thereof may be included. Each of these layers may also have a texture mapped thereon. For example, in addition to the variable regions of a customizable consumer product, the floor, including a rug, and the wall, including wainscoting, may be displayed as a layer with a lower depth attribute than the customizable consumer product. For example, a wall and/or floor may be the lowest depth attribute and be layered first, followed by wainscoting and/or trim and/or a rug or other accessories. The customizable consumer product may then be layered on top of these layers. This may allow a user to observe how a customizable consumer product may appear visually next to particular paint colors or flooring, for example, if the user has a particular room they want a customized sofa to go in, they can observe the sofa custom-made against the color scheme of their room. Other examples of layers may include sky, greenery, a patio, scenery, or other backgrounds against which a customizable consumer product may be used or placed.

In some embodiments, more than one texture may be mapped to a single layer in the compiled image. For example, a layer with more than one surface may have a different texture selected for each surface. In alternative embodiments, a layer may not have any textures applied to one or more of its surfaces. In other embodiments, none of the surfaces may have a texture mapped thereon.

Figure 8:
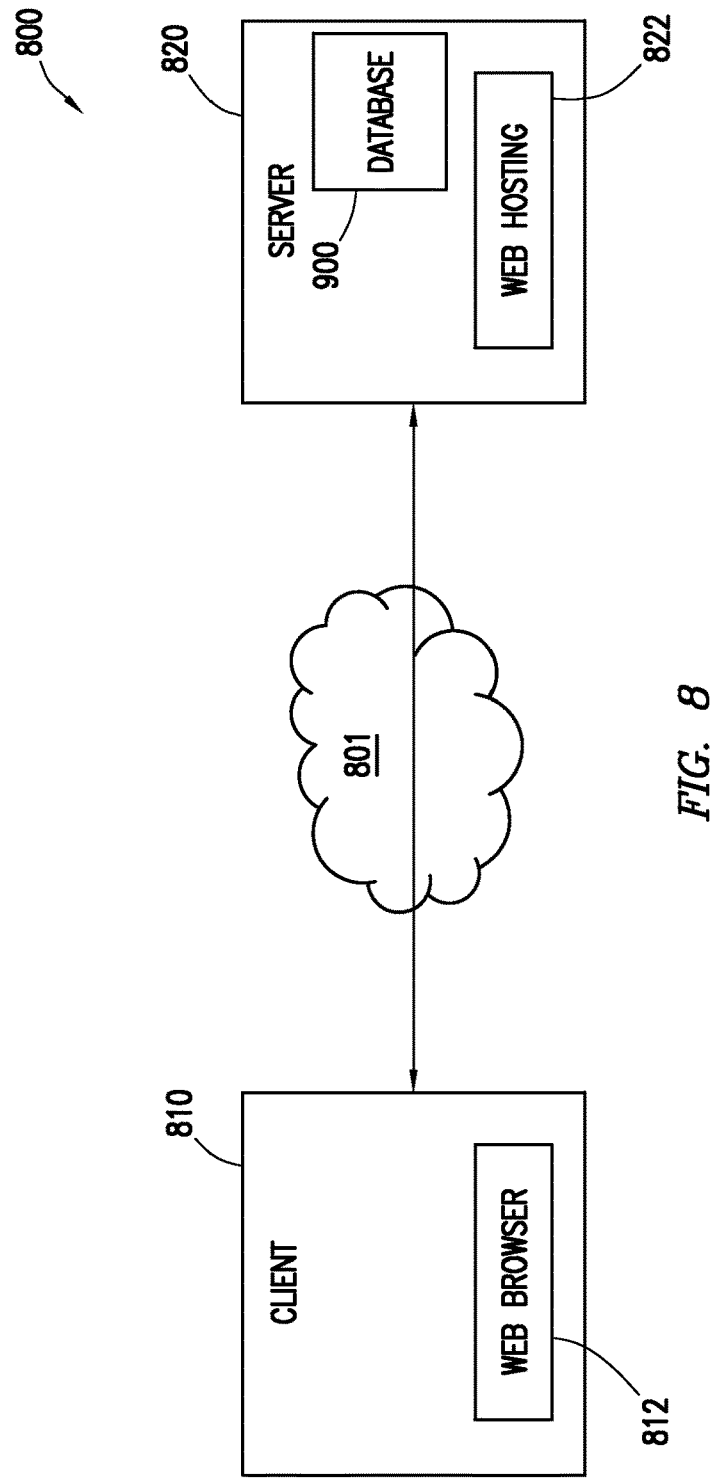
FIG. 8 illustrates an example system for generating and communicating an image of a customized consumer product.

Some embodiments of the present disclosure may be implemented in an internet or network based environment, as shown in FIG. 8. FIG. 8 illustrates an example of a system for generating and transmitting a compiled image to a user of a computer. System 800 may include a client computer 810 in communication with a server computer 820 via network 801. As shown in FIG. 8, client computer 810 may include a web browser application 812 running on client computer 810 to facilitate client computer 810 communicating with server 820 to view and interact with electronic material stored on server 820. Server 820 may include a web-hosting application 822 running on server 820 to facilitate server 820 communicating with client 810. Server 820 may include a database 900. In some embodiments, database 900 may be comparable to that shown in FIG. 9.

Network 801 may be any communication media or transmission media operable to facilitate communication between client computer 810 and server 820. This may include a local-area network (LAN), wide-area network (WAN), an intranet, or the internet. Additionally, while a direct communication line is shown, it will be appreciated that any number of steps, routings, or hops may occur in the communication path between client 810 and server 820.

A user of client computer 810 may desire to see an image of a customizable consumer product according to the user's choices. A user may select one or more textures and a variation of each layer of a customized consumer product at client 810. Those selections may be communicated to server 820 over network 801. Server 820 may dynamically compile an image of the customized consumer product based on the user's choices using database 900 as described herein. Server 820 may then transmit the compiled image to client 810 over network 801. In this way, client 810 may only receive a single image from server 820, despite selecting features of a customizable consumer product. Additionally, because the image is generated dynamically at server 820, a user may update or modify their selections and be sent a single image in response with a newly compiled image. This may also allow a user of client 810 to observe an image of customized consumer products without installing separate software or plug-ins. Additionally, this may allow server 820 to operate independently of the operating system, web browser 812, or other constraints of client 810 as all that is being sent to client 810 is an image.

In an alternative embodiment, database 900 may be contained on a third computer in communication with server 820. For example, an iframe element of hyper-text markup language (HTML) may be used. In such an embodiment, client 810 may transmit the user's selections to server 820. Server 820 may then communicate those selections to the third computer containing database 900. In some embodiments, the third computer will then send the single, compiled image to server 820, which may in turn send the image to client 810. Alternatively, the individual layers may be sent to server 820, and server 820 may compile the layers into a single image to be sent to client 810. In such an embodiment, the textures of database 900 may be stored at server 820 and applied there, rather than being applied at the third computer, or the textures may be applied by the third computer before passing the layers to server 820.

In some embodiments, the user may be provided with a default physical layout of a customized product, and the user may then select one or more features to modify the default layout. The user may also select textures for a given layer, a given surface within a layer, or combinations thereof. In some embodiments, a newly compiled image may be communicated after each individual selection, or after any number of selections have been made. Each of these selections, mappings, and providing of images may be performed in any order. For example, in some embodiments, a user may select a variety of modifications to a physical layout before selecting a texture, or a user may select a plurality of textures for the surfaces before making any selection to modify a physical layout, or a user may switch between selecting modifications to the physical layout and selecting textures to be mapped to various surfaces in the compiled images.

For the purposes of this disclosure, a computer may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a computer may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The computer may include random access memory (RAM), one or more processing resources such as a central processing unit (CPU) or hardware or software control logic, ROM, and/or other types of nonvolatile memory. Additional components of the computer may include one or more disk drives, one or more network ports for communicating with external devices as well as various input and output (I/O) devices, such as a keyboard, a mouse, touchscreen and/or a video display. The computer may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 9:
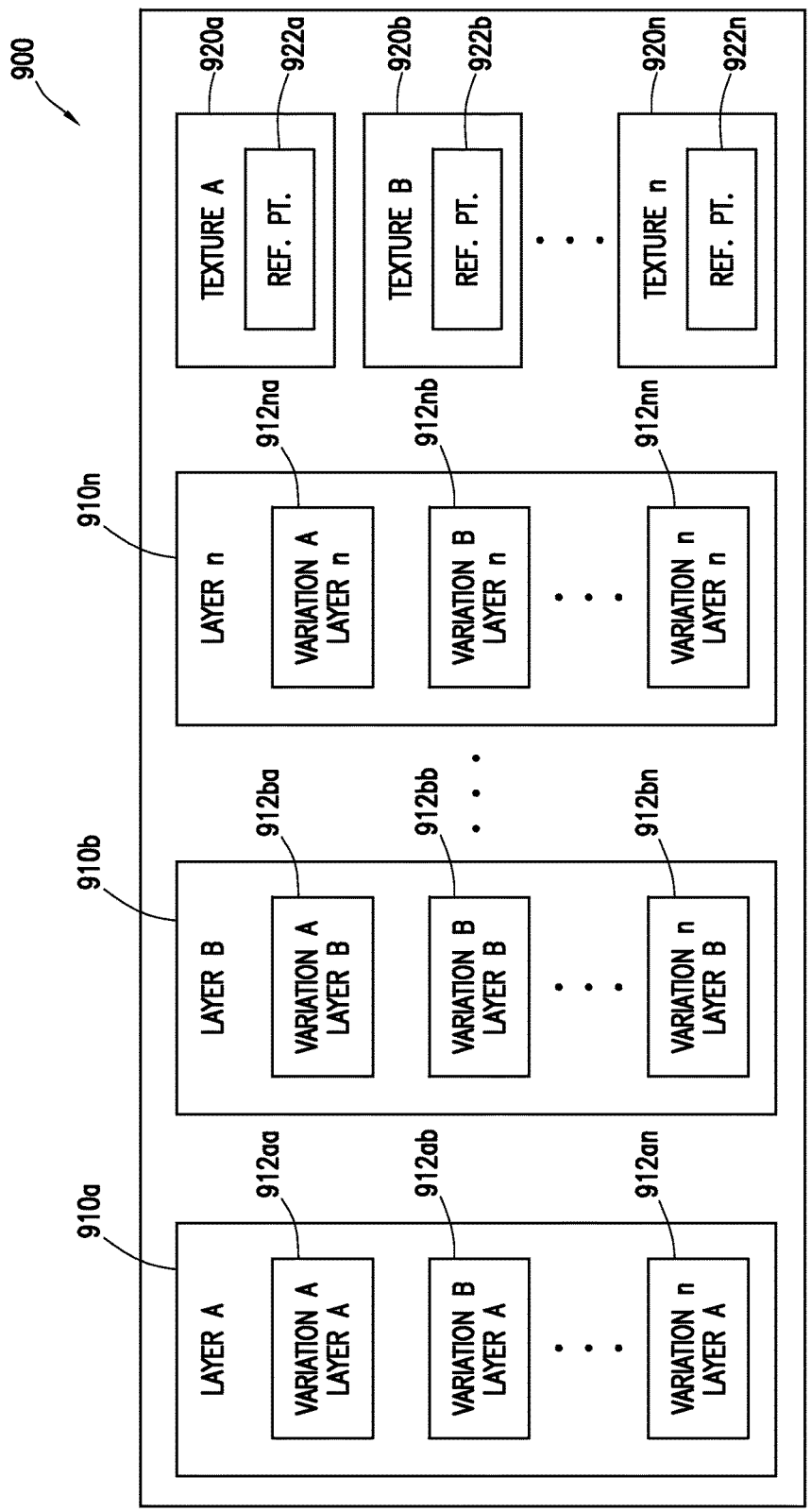
FIG. 9 illustrates an example of a database, in accordance with the present disclosure.

FIG. 9 illustrates an example of a database according to some embodiments of the present disclosure. Database 900 may be a directory of information related to a customizable consumer product that may be called out and referenced by computer-readable instructions such that an image of the customizable consumer product may be compiled. For example, in some embodiments, variations 912 of layers 910 and textures 920 of a customizable consumer product may be stored in a database 900. Database 900 may be accessed such that a single variation 912 of each layer 910 may be selected, read from database 900, and used to compile an image of a customized consumer product. Additionally, a texture 920 may be applied to the surfaces of each of the selected variations 912 to finish the compiled image. Database 900 may be in the form of any computer-readable data stored on a computer-readable media. Database 900 may be stored across multiple media.

Database 900 may include one or more layers 910, for example, layers 910*a*, 910*b*, . . . , and 910*n*. Database 900 may also include one or more variations 912 of each of those layers. For example, layer 910*a* may include variations 912*aa*, 912*ab*, . . . , and 912*an*; layer 910*b* may include variations 912*ba*, 912*bb*, . . . , and 912*bn*; and layer 910*n* may include variations 912*na*, 912*nb*, . . . , and 912*nn*. Database 900 may also include one or more textures 920, for example, textures 920*a*, 920*b*, . . . , and 920*n*. Each texture may include a reference point 922.

It will be appreciated that the use of ellipses and the variable n indicate that any number of components may be present. Further, it will be appreciated that only one layer 910, variation 912, or texture 920 may be part of database 900. Further, n may vary for each instance of n. For example, there may be forty textures and three layers, with the first layer having three variations, the second layer having only one variation, and the third layer having two variations.

Figure 10:
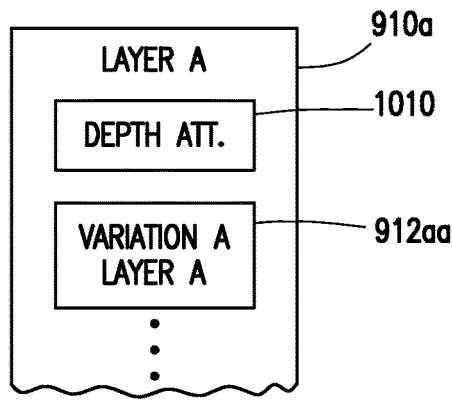
FIG. 10 illustrates an example of a layer component of a database, in accordance with the present disclosure.

FIG. 10 illustrates an example of a layer component of a database, according to some embodiments of the present disclosure. Layer 910*a* may correspond to a particular region or feature of a customizable consumer product. For example, layer 910*a* may correspond to the arms of a customizable sofa, or the crown of a cabinet, or the light fixtures of an entertainment center. In some embodiments, layer 910*a* may represent a variable region or feature, but need not. For example, layer 910*a* may represent a layer common to all iterations o the customizable consumer product. Alternatively, layer 910*a* may correspond to a floor layer, or a wall layer.

As shown in FIG. 10, layer 910*a* may include a depth attribute 1010. However, as described previously, layer 910*a* need not contain depth attribute 1010. Layer 910*a* may also include one or more variations 912, for example, variation 912*aa* as shown. While an example depiction of layer 910*a* is provided, it will be appreciated that each of layers 910 may have similar structural or logical designations.

Figure 11:
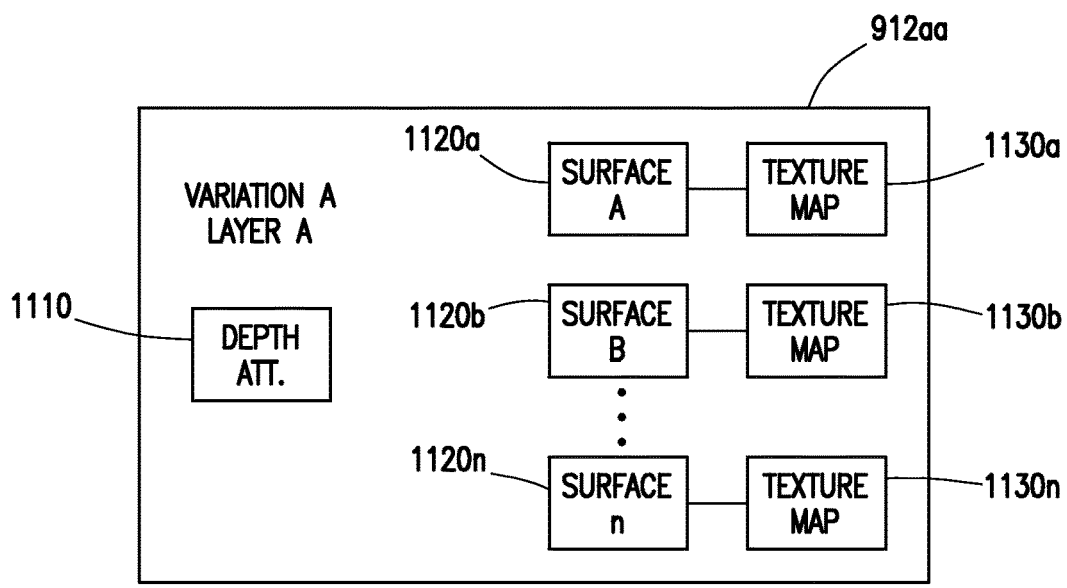
FIG. 11 illustrates an example of a variation component of a database, in accordance with the present disclosure.

FIG. 11 illustrates an example of a variation component of a database, according to some embodiments of the present disclosure. Variations 912*aa*-912*an* may represent each of the iterations or variations that are possible or selectable for a given layer 910*a*. For example, if layer 910*a* represents the arms of a sofa, variations 912*aa*-912*an* may represent images of each of the different arm styles separated such that they may be layered with other layers to form a composite image (for example, FIGS. 5A-5E).

As shown in FIG. 11, variation 912*aa* may include depth attribute 1110. In some embodiments, layer 910*a* may also contain a depth attribute 1010. In such an embodiment, one of depth attributes 1010 and 1110 may be designated as a higher priority, for example, depth attribute 1110 of variation 912*aa* may be used and depth attribute 1010 may be ignored when a depth attribute is used. Stated alternatively, depth attribute 1010 may be a default depth attribute for layer 1010*a*, unless variation 912*aa* has depth attribute 1110 and then depth attribute 1110 may be used. This is merely an example, and the roles may be reversed such that depth attribute 1010 overrides depth attribute 1110.

Variation 912*aa* may also include one or more surfaces 1120*a*, 1120*b*, . . . , and 1120*n*. Each of the one or more surfaces 1120 may have a corresponding texture map 1130 that has been generated and stored in database 900 to provide instructions as to how a texture should be mapped to the corresponding surface 1120. While an example depiction of variation 912*aa* is provided, it will be appreciated that each of variations 912 may have similar structural or logical designations.

Figure 12:
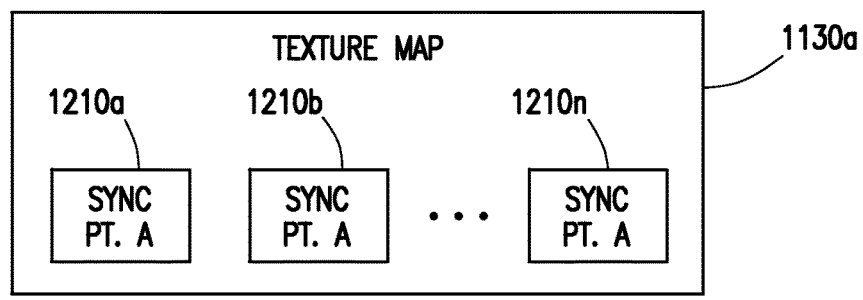
FIG. 12 illustrates an example of a texture map component of a database, in accordance with the present disclosure.

FIG. 12 illustrates an example of a texture map component of a database, according to some embodiments of the present disclosure. As shown in FIG. 12, texture map 1130*a* may include one or more sync points 1210*a*, 1210*b*, . . . , and 1210*n*. In some embodiments, texture map 1130*a* may include only a single sync point 1210 such that each texture's reference point may correspond to the same sync point for a given surface. Alternatively, texture map 1130*a* may include a plurality of sync points 1210. For example, each sync point 1210 may correspond to a different manufacturer's specification of where on a given surface a sync point should be such that a reference point in a texture is portrayed from a certain vantage point. Alternatively, a manufacturer may have multiple sync points 1210, with one of the sync points 1210 selected based on a type of the texture used. In such an embodiment, texture 920 may also include a type attribute. While an example depiction of texture map 1130*a* is provided, it will be appreciated that each of texture maps 1130 may have similar structural or logical designations.

The type attribute may designate which of a texture map's sync points should be used for a given texture. For example, this may be based on the size of the repeat unit of a texture, or may be based on the type of material used, or may be an arbitrary choice. For example, type may designate one of stripes, floral, plaid, weave, or any other general category of material.

In some embodiments, rather than texture map 1130 having multiple sync points 1210, a texture may have multiple reference points. In this way, the same result may be achieved by modifying which of the two corresponding points, the sync point and the reference point, are changed. Instead of changing where the same reference point on a given texture will map to by having multiple sync points, the point on the texture may be changed by having multiple reference points and a single sync point. Alternatively, multiple sync points and multiple reference points may be used.

With reference to previous figures, an example of the operation of database 900 with the example of a customizable sofa will be described. To generate the image shown in FIG. 6, a single variation 912 for each of the layers 910 may be selected. Each of those variations 912 of layers 910 may be compiled into a single image of the desired combination. A first layer 910 may have the lowest depth attribute 1010 and so be at the back of the compiled image, and only have a single variation 912. Next, a second layer 910 corresponding to the sofa backs may have the next depth attribute 1010. The variation 912 of sofa back shown in FIG. 3B may be selected and layered into the compiled image. Next, a third layer 910 corresponding to the sofa feet may have the next depth attribute 1010, and so may be layered into the image next. The variation 912 of sofa feet shown in FIG. 4A may be selected and layered into the compiled image. Lastly, a fourth layer 910 corresponding to the sofa arms may have the last depth attribute 1010, and so may be layered into the image last. The variation 912 of the sofa arms shown in FIG. 5A may be selected and layered into the compiled image.

Further, a texture 920 may be selected to be applied to each of the surfaces 1020 of each of the selected variations 912 according to the texture maps 1030. In particular, each of the sync points 1210 of the texture maps 1030 may align with the reference point 922 of the texture 920.

In some embodiments, the interaction of a texture with light may also be represented in the compiled image. In such embodiments, when creating the images of each variation, the interaction of the light with the surfaces may be depicted in the image. For example, the shadows and reflective nature of a surface may be depicted in the image. In some embodiments, once the digitized images of variations are received, for example those seen in FIGS. 5A-5E, this shadowing and reflection may be captured in the form of a negative of the image. This may then be reapplied after a texture has been applied. In this way, the interaction with light may be accented and amplified such that the texture may appear shiny. This may be desirable for some textures, such as polished metals instead of dull metals, or leathers instead of drab upholstery. In some embodiments, the application of the interaction with light may be applied based on the type attribute; for example, when a type attribute indicates that the type of texture is reflective leather.

In some embodiments, the following equations may be used to amplify the interaction of light with a surface.

$$F(x,y)=G(x,y)(T(x,y))$$

where F may be the function to compute the final image pixel color at image location (x, y), T may be the function to compute the color created by combining the relevant texture pixel with the shaded background image pixel at image location (x, y), and G may be the function to compute the light-amplified color pixel. For example:

$$G(x,y)=RGB(G_r(x,y),G_g(x,y),G_b(x,y))$$

$$G_r(x,y)=T_r(x,y)+=(255-T_r(x,y))*D;$$

$$G_g(x,y)=T_g(x,y)+=(255-T_g(x,y))*D$$

$$G_b(x,y)=T_b(x,y)+=(255-T_b(x,y))*D$$

$$D=(255-GIr(x,y))/255$$

where the subscript r may be the red channel, the subscript g may be the green channel, and b may be the blue channel. Additionally, GIr may be the negative image acquired of the underlying surface depicting the interaction of light with the surface.

In some embodiments, a smoothing algorithm may be used to address pixelation at the edges of the layers and the complete image. For example, the edges defining the boundaries of a surface may be a curve, but the electronic representation of that curve must be generated using pixels. As each pixel must be a single color, this may lead to jagged lines at the edges of a surface. This may be amplified when a texture is applied to a surface, particularly a pattern with high frequency, or rapid changes in color. To overcome this, an anti-aliasing technique may be used to minimize or smooth the jagged edges of the surface. For example, super-sampling may be used to take multiple samples from within a single pixel, and have the pixel display the average of the color values. By displaying the average color value, rather than one extreme, the jagged edges may appear more smoothed. This may be done for each individual layer as a texture is mapped to the surfaces, or may be done to the compiled image of multiple layers, or a combination of both. In some embodiments, a final smoothing step may be taken to remove the color from any pixels that spill outside of an outer boundary of the customized consumer product.

Figure 13:
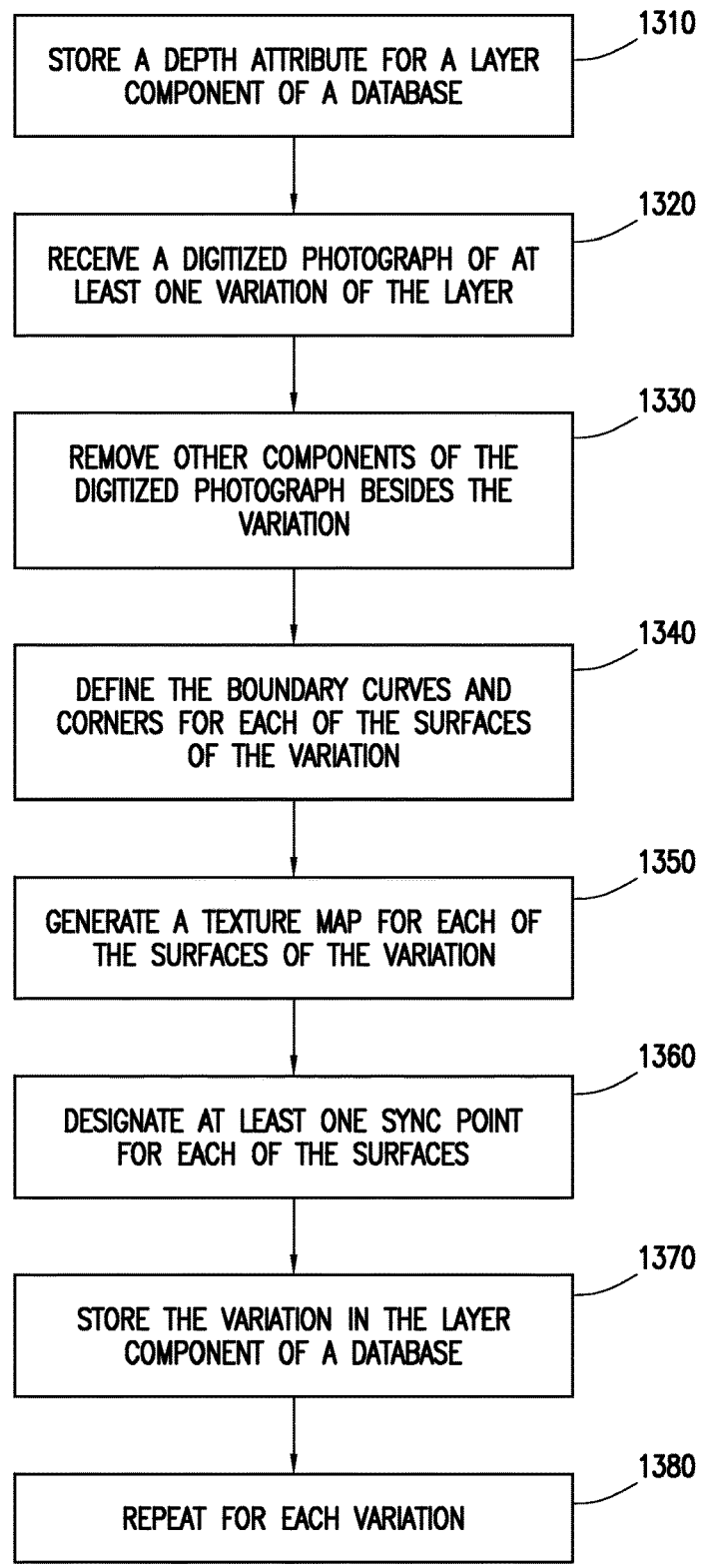
FIG. 13 illustrates an example set of operations for generating a layer component of a database, in accordance with the present disclosure.

FIG. 13 illustrates an example set of operations to generate a layer component to be stored in a database, according to some embodiments of the present disclosure. As shown in FIG. 13, operation 1310 includes storing a depth attribute for a layer component of a database. For example, if this layer corresponded to arms of a customizable sofa, the layer might be given a depth attribute corresponding to a depth at the top of a compiled image.

Operation 1320 includes receiving a digitized photograph of at least one variation of the layer. Each variation may include one or more surfaces. For example, this may include receiving a digitized photograph of at least one of the variations of sofa arms that may be used in the customized sofa (for example, those shown in FIGS. 5A-5E). In some embodiments, this may be a computer-generated image rather than a digitized photograph.

Operation 1330 includes removing other components of the digitized photograph besides the variation. For example, this may include removing a sofa back, a sofa seat, sofa feet, or other features such that only the sofa arms remain in the photograph. This may also include removing any texture from the original photograph of the variation such that a plain representation of the variation remains. For example, the pattern of upholstery on the arms may be removed such that another texture may be applied to the arms later. This may also include causing the remainder of the photograph besides the variation to be transparent, such that when it is layered with other layers in a compiled image the other images may be seen through the transparent portions of the photograph.

Operation 1340 includes defining the boundary curves and corners for each of the surfaces of the variation. For example, this may include defining the curves and corners for each of the surfaces of the arms of the sofa of the particular variation.

Operation 1350 includes generating a texture map for each of the surfaces of the variation. For example, this may include bilinearly interpolating between the boundary curves to create a Coons surface for each of the surfaces on the sofa arms of the particular variation.

Operation 1360 includes designating at least one sync point for each of the surfaces. Operation 1370 includes storing the variation in the layer component of the database. Operation 1380 includes repeating operations 1330-1370 for each of the variations for which a digitized photograph was received at operation 1320.

While operations 1310-1380 are shown in a linear fashion, it will be appreciated that these steps may be done in a different order, or done simultaneously. For example, operation 1310 may be performed after operation 1380, or operation 1330 may be performed after operation 1350 or 1360.

Figure 14:
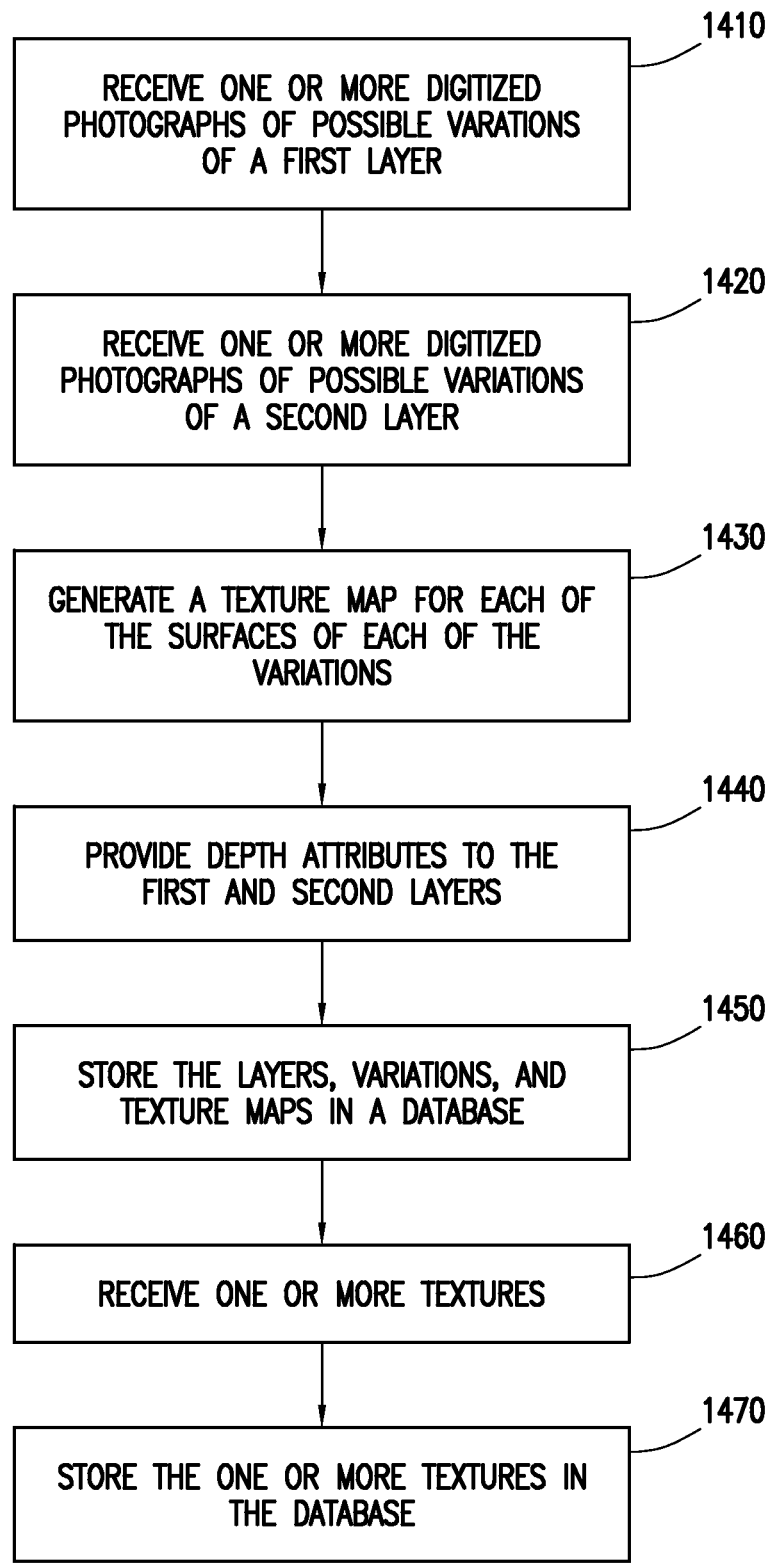
FIG. 14 illustrates an example set of operations for constructing a database, in accordance with the present disclosure.

FIG. 14 illustrates an example set of operations to generate a database, according to some embodiments of the present disclosure. As shown in FIG. 14, operation 1410 includes receiving one or more digitized photographs of possible variations of a first layer. Each of these variations may include one or more surfaces. For example, if the database were being constructed for compiling an image of a customizable couch, the first layer might correspond to the back of a sofa, and digitized photographs of variations of the sofa back might be received. In some embodiments, a computer-generated image may be received instead of a digitized photograph.

Operation 1420 includes receiving one or more digitized photographs of possible variations of a second layer. Each of these variations may include one or more surfaces. For example, the second layer might correspond to the feet of a sofa, and digitized photographs of variations of the sofa feet might be received. In some embodiments, a computer-generated image may be received instead of a digitized photograph.

Operation 1430 includes generating a texture map for each of the surfaces of each of the variations. This may include designating one or more sync points for each of the texture maps. As described previously, generating a texture map may include defining boundary curves of a surface and bilinearly interpolating between the curves to create a Coons surface such that a texture may be warped according to the Coons surface.

Operation 1440 includes providing depth attributes to the first and second layers. Operation 1450 includes storing the layers, variations, and texture maps in a database. For example, this may include storing the variations as sub-components of the layer component of the database and the texture maps as sub-components of the variations and associated with the surfaces of the variations.

Operation 1460 includes receiving one or more textures. For example, this may include receiving digital representations of the textures which may be used on a customized sofa. Each texture may also include a reference point. Operation 1470 includes storing the one or more textures in the database.

While operations 1410-1470 are shown in a linear fashion, it will be appreciated that these steps may be done in a different order, and/or done simultaneously. For example, operations 1460-1470 and operations 1410-1450 may be done simultaneously, or operations 1460-1470 may be performed before operations 1410-1450. As an alternative example, operation 1440 may be done before operation 1430. Additionally, it will be appreciated that these operations may be modified or repeated to include any number of layers, and any number of variations within those layers. For example, there might be four layers, and one of those layers might only have one variation.

Figure 15:
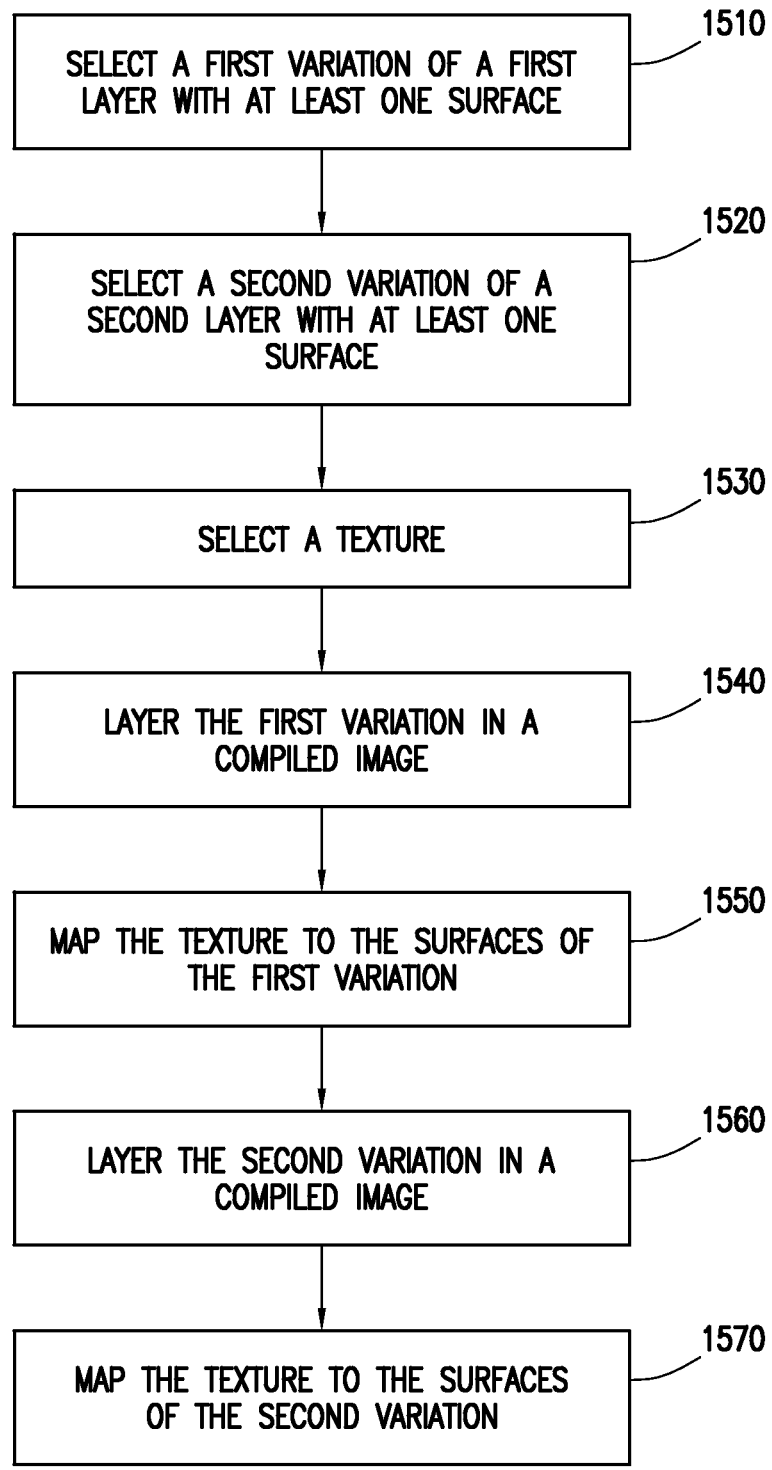
FIG. 15 illustrates an example set of operations for generating an image of a customized consumer product, in accordance with the present disclosure.
Figure 16A:
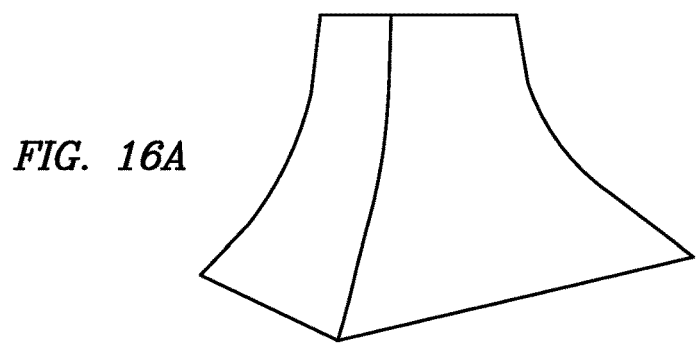
FIGS. 16A-16E illustrate example layers of an alternative example of a customizable consumer product.
Figure 16B:
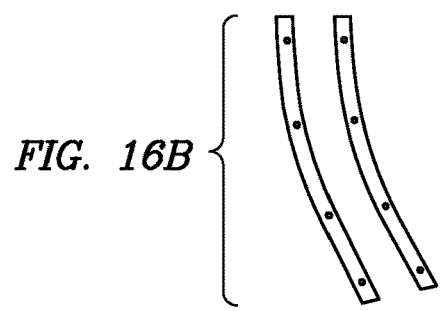
Figure 16C:
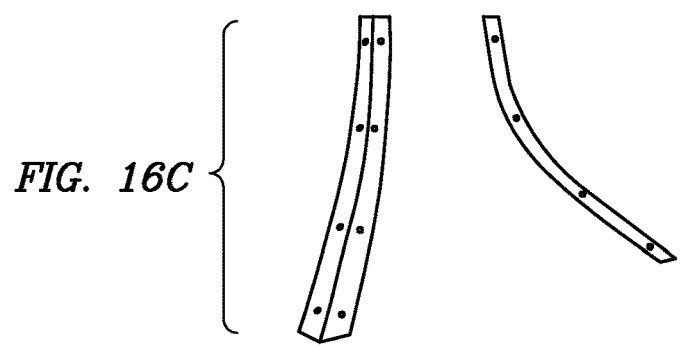
Figure 16D:
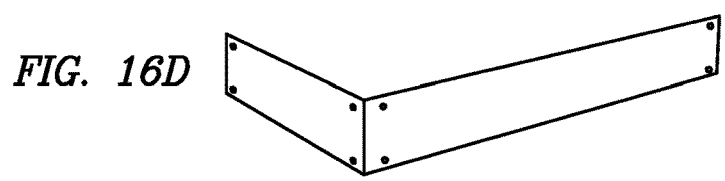
Figure 16E:
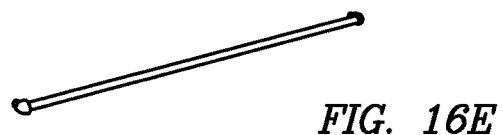

FIG. 15 illustrates an example set of operations for generating an image of a customized consumer product, in accordance with some embodiments of the present disclosure. Operation 1510 includes selecting a first variation of a first layer, the variation having at least one surface. This may include selecting the variation from a layer component in a database. Additionally, the variation may have associated texture maps for each of its surfaces that are also selected by virtue of selecting the variation. The texture maps may include sync points. The first layer may have a depth attribute, or the variation may have a depth attribute, or they may both have a depth attribute. For example, using previous figures, if the first layer corresponds to arms of a sofa as shown in FIGS. 5A-5E, the variation shown in FIG. 5A might be selected.

Operation 1520 includes selecting a second variation of a second layer, the second variation having at least one surface. This may include selecting the variation from a layer component in a database. Additionally, the variation may have associated texture maps for each of its surfaces that are also selected by virtue of selecting the variation. The texture maps may include sync points. The second layer may have a depth attribute, or the variation may have a depth attribute, or they may both have a depth attribute. For example, if the second layer corresponds to the back of a sofa as shown in FIGS. 3A-3C, the variation shown in FIG. 3B might be selected.

Operation 1530 includes selecting a texture. This may include selecting the texture from a database, and the texture may include a reference point. Additionally, this may include selecting more than one texture. For example, a floral upholstery may be selected.

Operation 1540 includes layering the first variation in a compiled image. For example, this may include reading the depth attribute of the first layer or the first variation, and layering the first variation in a compiled image according to the depth attribute. For example, if the first layer contained a depth attribute indicating that the first variation of the first layer was to be on the bottom of the compiled image, the first variation of the first layer may be placed as the bottom layer.

Operation 1550 includes mapping the texture to the surfaces of the first variation. This may include aligning the texture such that the reference point of the texture and the sync point of the texture map are aligned. This may also include warping, wrapping, or draping the texture onto the surface according to the texture map. For example, a floral upholstery for the customizable sofa may be selected as the texture, and the digital image of the upholstery may be mapped onto the surfaces of the arms of the sofa selected at operation 1510. This may also include augmenting the light interaction for this texture. For example, if the texture selected is leather, the light interaction for the variation may be re-applied after the leather texture has been mapped onto the surface. If more than one texture were selected at operation 1530, this may include mapping the alternative texture to one or more of the surfaces of the first variation.

Operation 1560 includes layering the second variation in the compiled image. For example, this may include reading the depth attribute of the second layer or the second variation, and layering the second variation in the compiled image according to the depth attribute. For example, if the second layer contained a depth attribute indicating that the second variation of the second layer was to be on the top of the compiled image, the second variation of the second layer may be placed as the top layer.

Operation 1570 includes mapping the texture to the surfaces of the second variation. This may include aligning the texture such that the reference point of the texture and the sync point of the texture map are aligned. This may also include warping, wrapping, or draping the texture onto the surface according to the texture map. Following the above example, upholstery for the customizable sofa may be selected as the texture, and the digital image of the upholstery may be mapped onto the surfaces of the back of the sofa selected at operation 1520. This may also include augmenting the light interaction for this texture. For example, if the texture selected is leather, the light interaction for the variation may be re-applied after the leather texture has been mapped onto the surface. If more than one texture were selected at operation 1530, this may include mapping the alternative texture to one or more of the surfaces of the second variation.

While operations 1510-1570 are shown in a linear fashion, it will be appreciated that these steps may be done in a different order, and/or done simultaneously. For example, operations 1540-1550 and operations 1560-1570 may be done simultaneously, or operations 1560-1570 may be performed before operations 1540-1550. As an alternative example, operation 1550 may be done after operation 1560. Alternatively, operations 1510, 1520, and 1530 may be done concurrently, or in any order. Additionally, it will be appreciated that these operations may be modified or repeated to include any number of layers, and any number of variations within those layers. For example, there might be four layers, and one of those layers might only have one variation. For most embodiments only a single variation for each layer may be selected.

Figure 17:
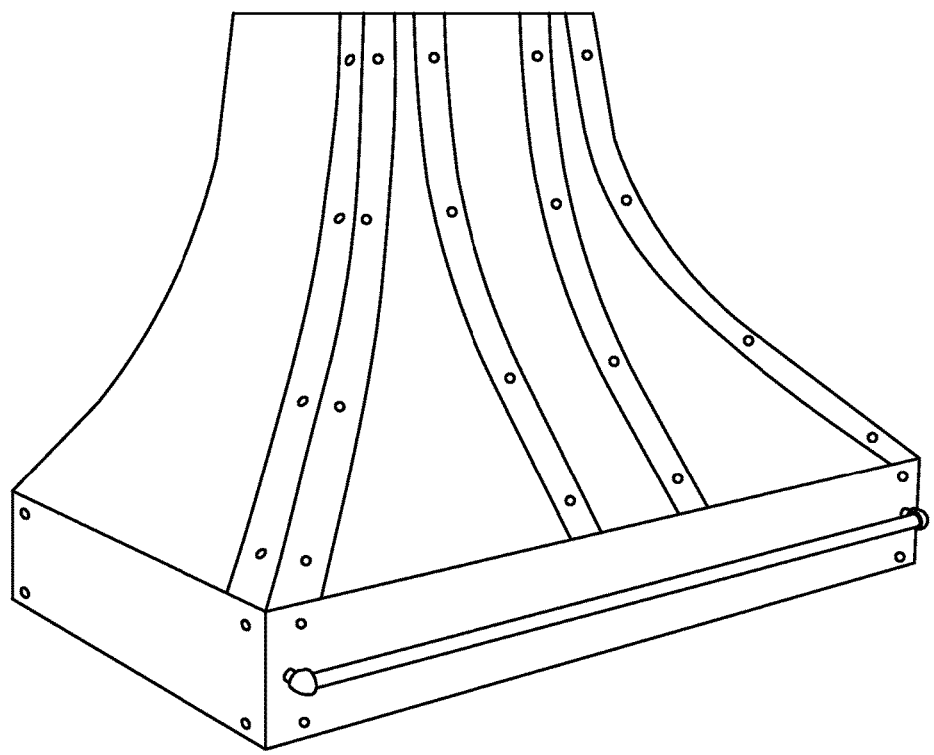
FIG. 17 illustrates an example of a compiled image of a customizable consumer product.

FIGS. 16A-16E and 17 illustrate an example embodiment of the present disclosure. For example, FIGS. 16A-16E illustrate examples of variations of a vent hood. FIG. 17 illustrates an example compiled image of the vent hood using the variations of FIGS. 16A-16E.

Although the present disclosure has been described in detail, it should be understood that various changes, substitutions, and alterations can be made hereto without departing from the spirit and the scope of the disclosure as defined by the appended claims.

What is claimed is:

1. A method for electronically generating a single image comprising:
   receiving a selection of a first consumer product layer with a first surface;
   receiving a selection of a second consumer product layer with a second surface; and
   layering the first consumer product layer and the second consumer product layer in the single image such that a first patterned texture depicts a first designated manufacturer visual appearance of the first surface associated with the first patterned texture and a second patterned texture depicts a second designated manufacturer visual appearance of the second surface associated with the second patterned texture;
   wherein the first surface includes a texture map including a first sync point and a second sync point,
      the first sync point selected for the first surface by a first manufacturer to correspond to a designated manufacturer reference point of the first patterned texture such that the first patterned texture depicts a manufacturer specification of the first manufacturer,
      the second sync point selected for the first surface by a second manufacturer to correspond to the designated manufacturer reference point of the first patterned texture such that the first patterned texture depicts a manufacturer specification of the second manufacturer.

2. The method of claim 1, the method further comprising:
   receiving a selection of a first texture from a plurality of textures as the first patterned texture;
   receiving a selection of a second texture from the plurality of textures as the second patterned texture;
   mapping the first texture to the first surface; and
   mapping the second texture to the second surface.

3. The method of claim 1, wherein the first consumer product layer and the second consumer product layer correspond to at least one of a sofa, loveseat, ottoman, chair, or sectional couch.

4. The method of claim 1, further comprising applying a smoothing algorithm to address pixelation at edges of the first consumer product layer.

5. The method of claim 1, wherein the first consumer product layer is derived from at least one photograph or digital photograph.

6. The method of claim 1, wherein the first patterned texture and the second patterned texture are the same texture.

7. A non-transitory computer-readable medium containing instructions, that when executed by a processor, are configured to perform one or more operations, the operations comprising:
   receiving a selection of a first consumer product layer with a first surface;
   receiving a selection of a second consumer product layer with a second surface; and
   layering the first consumer product layer and the second consumer product layer in a single image such that a first patterned texture depicts a first designated manufacturer visual appearance of the first surface associated with the first patterned texture and a second patterned texture depicts a second designated manufacturer visual appearance of the second surface associated with the second patterned texture;
   wherein the first surface includes a texture map including a first sync point and a second sync point,
      the first sync point selected for the first surface by a first manufacturer to correspond to a designated manufacturer reference point of the first patterned texture such that the first patterned texture depicts a manufacturer specification of the first manufacturer,
      the second sync point selected for the first surface by a second manufacturer to correspond to the designated manufacturer reference point of the first patterned texture such that the first patterned texture depicts a manufacturer specification of the second manufacturer.

8. The computer-readable medium of claim 7, the operations further comprising:
   receiving a selection of a first texture from a plurality of textures as the first patterned texture;
   receiving a selection of a second texture from the plurality of textures as the second patterned texture;
   mapping the first texture to the first surface; and
   mapping the second texture to the second surface.

9. The computer-readable medium of claim 7, wherein the first consumer product layer and the second consumer product layer correspond to at least one of a sofa, loveseat, ottoman, chair, or sectional couch.

10. The computer-readable medium of claim 7, the operations further comprising applying a smoothing algorithm to address pixelation at edges of the first consumer product layer.

11. The computer-readable medium of claim 7, wherein the first consumer product layer is derived from at least one photograph or digital photograph.

12. The computer-readable medium of claim 7, wherein the first patterned texture and the second patterned texture are the same texture.

13. A system comprising:
   one or more processors; and
   a non-transitory computer-readable medium containing instructions, that when executed by the one or more processors, are configured to cause the one or more processors to perform one or more operations, the operations comprising:
      receiving a selection of a first consumer product layer with a first surface;
      receiving a selection of a second consumer product layer with a second surface; and
      layering the first consumer product layer and the second consumer product layer in a single image such that a first patterned texture depicts a first designated manufacturer visual appearance of the first surface associated with the first patterned texture and a second patterned texture depicts a second designated manufacturer visual appearance of the second surface associated with the second patterned texture;

wherein the first surface includes a texture map including a first sync point and a second sync point, the first sync point selected for the first surface by a first manufacturer to correspond to a designated manufacturer reference point of the first patterned texture such that the first patterned texture depicts a manufacturer specification of the first manufacturer, the second sync point selected for the first surface by a second manufacturer to correspond to the designated manufacturer reference point of the first patterned texture such that the first patterned texture depicts a manufacturer specification of the second manufacturer.

14. The system of claim 13, the operations further comprising:
receiving a selection of a first texture from a plurality of textures as the first patterned texture;
receiving a selection of a second texture from the plurality of textures as the second patterned texture;
mapping the first texture to the first surface; and
mapping the second texture to the second surface.

15. The system of claim 13, the operations further comprising applying a smoothing algorithm to address pixelation at edges of the first consumer product layer.

16. The system of claim 13, wherein the first consumer product layer is derived from at least one photograph or digital photograph.

17. The system of claim 13, wherein the first patterned texture and the second patterned texture are the same texture.

* * * * *